(12) United States Patent
Moser et al.

(10) Patent No.: US 8,681,317 B2
(45) Date of Patent: Mar. 25, 2014

(54) TRACKING METHOD AND MEASURING SYSTEM HAVING A LASER TRACKER

(75) Inventors: Daniel Moser, Seengen (CH); Joel Martin, Aarau (CH); Konrad Von Arb, Wangen bei Olten (CH)

(73) Assignee: Leica Geosystems AG, Heerbrugg (CH)

( * ) Notice: Subject to any disclaimer, the term of this patent is extended or adjusted under 35 U.S.C. 154(b) by 247 days.

(21) Appl. No.: 13/377,209

(22) PCT Filed: Jun. 14, 2010

(86) PCT No.: PCT/CH2010/000154
§ 371 (c)(1),
(2), (4) Date: Jan. 17, 2012

(87) PCT Pub. No.: WO2010/148526
PCT Pub. Date: Dec. 29, 2010

(65) Prior Publication Data
US 2012/0105821 A1    May 3, 2012

(30) Foreign Application Priority Data

Jun. 23, 2009  (CH) .......................... 973/09

(51) Int. Cl.
*G01C 3/08* (2006.01)
(52) U.S. Cl.
USPC .......... 356/3.09; 356/3.01; 356/3.1; 356/4.01

(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 7,292,788 B2 | 11/2007 | Triebes et al. |
| 2013/0063715 A1 * | 3/2013 | Boeckem et al. ............... 356/51 |

FOREIGN PATENT DOCUMENTS

| WO | 2007/079600 | 7/2007 |
| WO | 2007/079601 | 7/2007 |
| WO | WO2007079600 | * 7/2007 |
| WO | WO2011127617 | * 10/2011 |

* cited by examiner

*Primary Examiner* — Luke Ratcliffe
(74) *Attorney, Agent, or Firm* — Rankin, Hill & Clark LLP

(57) ABSTRACT

A target equipped with a reflector can be tracked in a measuring system including a laser tracker. The reflector is tracked by means of a tracking unit in a normal tracking mode and by means of a surveying device in an extraordinary tracking mode. A capturing unit having a detection range lying between the detection ranges of the tracking unit and of the surveying device is also present. If the target cannot be detected by the tracking unit but can be detected by the capturing unit, the orientation of the tracking unit is controlled according to a measurement by the capturing unit. If the target can then be detected by the tracking unit, a transition to the normal tracking mode is initiated. If the target can be detected only by the surveying device, the orientation of the tracking unit is controlled according to a measurement of the surveying device.

15 Claims, 2 Drawing Sheets

TRACKING METHOD AND MEASURING SYSTEM HAVING A LASER TRACKER

BACKGROUND OF THE INVENTION

1. Field of the Invention

The invention lies in the field of measurement technology and relates to a tracking method and to a measurement system with a laser tracker, according to the preambles of the respective patent claims. The tracking method serves for the automatic tracking of a target point, in particular of a moving target point, with the measurement beam of a laser tracker. The measurement system with the laser tracker is equipped for carrying out the method.

2. Description of Related Art

So-called laser trackers are frequently applied for measurement of the position of moving target points. The term laser trackers is to be understood as devices which comprise at least one distance meter operating with a focussed laser beam (called measurement beam in the following description). For example, the direction of the measurement beam is set to the target point with the help of a mirror which is rotatable about two axes, and is detected with angle sensors assigned to the rotation axes. The target point to be measured is provided with a retro-reflector (in particular cube-corner prism or arrangement of three mirrors which are perpendicular to one another), wherein the retroreflector reflects the measurement beam of the laser tracker which is incident thereon, back to this laser tracker. Thereby, the reflected measurement beam runs coaxially to the emitted measurement beam when the measurement beam hits the reflector in an exactly central manner, and runs offset parallel thereto, when the measurement beam does not hit the reflector in a centric manner. An absolute distance between the laser tracker and the target point and/or a change of this distance is deduced from a comparison of the emitted and reflected laser light, depending on the embodiment of the tracker. The position of the reflector or of the target point relative to the tracker is computed from the angles detected by the angle sensors and the distance detected by the distance meter.

A part of the reflected measurement beam is usually led onto a PSD (position sensitive device). One can infer the parallel shift of the reflected beam relative to the emitted measurement beam, from the position, in which the reflected measurement beam is incident on the light-sensitive surface of the PSD. The measurement data which is determined by way of this defines the parallel offset of the reflected measurement beam and is used for a control of the measurement beam direction, in a manner such that the measurement beam follows the target point (tracking) when this moves. This means that by way of a suitable change of the measurement beam direction or the alignment of the mirror aligning the measurement beam, one ensures that the parallel offset between the emitted and reflected measurement beam is reduced or remains as small as possible.

It is evident that the control of the measurement beam direction by way of the parallel offset between the emitted and the reflected measurement beam, although having a small delay, however has a delay which is not negligible and limits the speed at which a target point may move and thereby be tracked. If the target point moves more rapidly, the measurement beam, before its direction can be suitably corrected, no longer hits the reflector, and the tracking as well as positioning, are interrupted by way of this. The same may happen if an obstacle gets between the tracker and the target point, so that the measurement beam is interrupted. If the laser tracker or the measurement beam of the laser tracker "loses" the reflector, the operating person is made aware of this and a search routine can be started given a suitable design of the tracker.

The measurement of the position of the target point and its tracking by the measurement beam can be assumed again as soon as the target point is "found" again, which is to say that the measurement beam is again incident on the reflector and is reflected by this, for which the distance measurement must be newly initiated as the case may be. The mentioned tracking interruptions become more frequent, the less controlled are movements of the target point and the smaller are the applied reflector and the diameter of the measurement beam. The same conditions as during the mentioned tracking interruptions usually also prevail at the beginning of a measurement process, when the tracker is not at all yet set onto the target point.

It is also known to provide laser trackers with an overview apparatus. This camera which has an, as large as possible, field of view (for example over ±20° in all directions), is arranged on the tracker and is aligned in a manner such that the measurement beam can be directed onto a target point recognised on the camera picture. The alignment of the measurement beam onto this target point is initiated by an operating person observing the camera picture, by way of this operating person suitably indicating the picture region in which the target point is imaged.

A tracking method and a measurement system with a laser tracker which has two tracking modes, and the measurement system switches from one of the tracking modes into the other when the measurement beam of the laser tracker "loses" the target point or "finds it again", is described in WO 2007/079601 A1. The normal or ordinary tracking mode is the tracking which is known for laser trackers and which is based on the measurement beam, in which thus for example, the parallel offset between the emitted and reflected measurement beam is detected and one strives for a reduction of this offset by way of changing the measurement beam direction. In the normal tracking mode, the tracker detects the measurement beam which is reflected by the reflector, and a determining of the target point position is possible at any time. In the extraordinary tracking mode, in which the measurement system operates when the tracker cannot detect the reflected measurement beam, the change of the measurement beam direction is controlled by way of data which is recorded by an overview apparatus assigned to the laser tracker. The overview apparatus, for example, is a digital overview camera which provides picture data and has a light-sensitive surface (e.g. CCD) and optics which give the overview camera a viewing angle for example of ±20° in all directions, which is common for an overview apparatus. The overview apparatus can however for example also be a PSD (position sensitive device) which is equipped with the same or similar optics and which only provides position data with respect to the sensor, thus direction data with regard to the apparatus. A direction to the reflector is determined from the data registered by the overview apparatus and, with a suitable change in the measurement beam direction, one attempts to direct this onto the reflector. The extraordinary tracking mode thus operates without a detection of the reflected measurement beam, and an exact determining of the position of the target point with the help of the tracker is not possible in the extraordinary tracking mode. The extraordinary tracking mode is switched on as soon as no reflected measurement beam is detected in the tracker. In the extraordinary tracking mode however, one always checks again and again, as to whether a reflected measurement beam is detected or not, and as soon as this is the case, the system switches again into the ordinary tracking mode and the position measurement is released.

The described device and the corresponding method thus can localise a "lost" target point again and thereafter again determine the position of the target point. However, their capability of following rapid changes in the angular position of the target point with regard to the tracker is however limited. This is of particular relevance, if the target point is located close to the tracker, and a given absolute position change—compared to a target point distanced further away—corresponds to a greater change of the angle at which the target point is seen from the tracker. Furthermore, it is necessary for the target point to be able to be held in a relatively calm manner for localising, until the capture is concluded and the position measurement can be activated again.

Similar tracking methods using cameras or sensors with a narrow or wide viewing angle are also described in the following three publications:

EP 2 071 283 A2 describes the use of two separate cameras with a wide and narrow viewing angle, in each case with their own light source coupled into the camera optics. The cameras are arranged separately from one another, one of these with the viewing axis colinear to a distance meter, and operate with visible light. A target recognition is accomplished in each case by switching on/off the respective light source and a subsequent difference formation from the respective pictures.

WO 2009/046763 A1 shows two stages with the target tracking, wherein one switches over between a close range setting of optics, with a wide viewing angle, and a long range setting with a narrow viewing angle.

U.S. Pat. No. 7,292,788 B2 describes a laser-based communication with a satellite, wherein a received light beam is tracked with wide field sensors and narrow field sensors. FIG. 4B shows an apparatus for a two-stage measurement: either an intermediate/acquisition track sensor (660) or a fine track quad cell (650) is applied, in order to lead a laser beam into a fibre-optic (640). Other embodiments or experimental arrangements (FIG. 4A) likewise use two-stage methods.

BRIEF SUMMARY OF THE INVENTION

It is the object of the invention to provide a tracking method and a measurement system with laser trackers which is designed for the tracking method, which permit the tracking interruptions discussed above, to be bridged not only automatically, but also with high dynamics. A further object is to provide the possibility, given a tracking interruption, of capturing the target point again and starting the position measurement again, while the target point is moved. A further object is to provide a measurement system which permits a comparatively large opening angle (viewing angle) of the overview camera.

This object is achieved by the tracking method and the measurement system with a laser tracker, as defined in the patent claims.

Thus a target provided with a reflector is tracked by a measurement beam of a laser tracker in the tracking method. In a normal tracking mode, the measurement beam reflected by the reflector is detected in a tracking unit, and a variable for the control of the alignment of the measurement beam is computed from the detection. In an extraordinary tracking mode, in which the measurement beam reflected by the reflector is not detected in the tracking unit, variables for the control of the alignment of the measurement beam are computed from data which are acquired by at least one further apparatus. Thereby, the laser tracker comprises a capture unit and an overview apparatus, wherein the capture unit as well as the overview apparatus have a known position and orientation relative to the measurement beam. The capture unit comprises a detection region or detection angle which lies between the detection region of the tracking unit and the detection region of the overview apparatus.

The method in the extraordinary tracking mode carries out the following steps:
  in the case that the target is detectable by the capture unit, controlling the alignment of the measurement beam in accordance with an angle at which the target is visible to the capture unit, and checking as to whether the target can be detected by the tracking unit;
  in the case that the target is then detectable by the tracking unit, changing over to the normal tracking mode;
  in the case that the target is only detectable by the overview apparatus, controlling the alignment of the measurement beam in accordance with an angle at which the target is visible to the overview apparatus, and checking as to whether the target can be detected by the capture unit.

In other words, thus in the extraordinary tracking mode, the variables for the control of the alignment of the measurement beam is computed from data which is acquired selectively by the capture unit or by the overview apparatus, and, if necessary, one changes between the localisation of the target with the capture unit and with the overview apparatus, until the target is detected with the tracking unit. The described steps are thus carried out repeatedly until the transition to the normal tracking mode is effected.

By way of this, the opening angle or the field of view of the overview camera is no longer limited by way of the resolution of the overview camera having to be adequately high, so that the target can be reliably captured by the tracker. The intermediately arranged capture unit captures the target by way of the data of the overview camera, and refines the alignment of the tracker such that the target is captured by the tracker.

By way of this, it is possible to increase the viewing angle or detection range of the overview apparatus, such that it is also possible to follow the target even with rapid changes of the angle at which the measurement apparatus sees the target, thus above all when the target is moved close to the measurement apparatus.

Theoretically, in the case that the target can only be detected by the overview apparatus, then instead of the alignment of the measurement beam, one can firstly only carry out an alignment of the capture unit. Since, as a rule, the capture unit and the tracking unit are however moved with one another, this, as a rule, is also equivalent to the alignment of the measurement beam.

In a preferred embodiment of the invention, with the transition to the normal tracking mode, one carries out an absolute distance initialisation (on the fly), for determining an absolute distance between the laser tracker and the target. Such a method is described for example in the published patent applications EP 1 647 838 A1 and US 2009/0033945. With this, apart from the azimuth and elevation of the target (with respect to the laser tracker), its distance is also known.

In a further preferred embodiment of the invention, the overview apparatus comprises a zoom function and with this an adjustable detection angle, and, in the case that the target cannot be detected by the overview apparatus at a small detection angle, the following steps are carried out:
  increasing the detection angle of the overview apparatus, and checking as to whether the target can be detected by the overview apparatus;
  in the case that the target can be detected by the overview apparatus, controlling the alignment of the measurement beam in accordance with the angle at which the target is visible to the overview apparatus; and
  reducing the detection angle of the overview apparatus; or optionally, in the case that the target cannot be detected by the overview apparatus, carrying out a search routine for localising the target by way of moving the overview apparatus.

In another preferred embodiment of the invention, by way of a deflection device, selectively either, in a first operating mode of the deflection device, the tracking unit and the capture unit;

or, in a second operating mode of the deflection device, the overview apparatus can be aligned or guided with their beam path onto the target. Thereby, the method comprises the following further steps:

operating in the first operating mode, or changing to the first operating mode, when the tracking unit or the capture unit detect or search the target, operating in the second operating mode, or changing to the second operating mode, when the overview apparatus detects or searches the target.

In these preferred embodiments of the invention therefore, the target is not simultaneously visible to the tracking unit and the overview apparatus, for example because the beam path either of the tracking unit or of the overview apparatus can be selectively directed to the target by way of a tracking mirror. With this embodiment, although it would be possible—without the capture unit—for a moved target to be localised by the overview apparatus and for the alignment of the measurement beam to be corrected accordingly, after turning the tracking mirror however, this alignment would no longer be correct due to the time delay. Here, the capture unit permits the capture of the target even with an imprecise alignment after turning the mirror.

A target provided with a reflector can be tracked by a measurement beam of a laser tracker, in the measurement system with laser tracker. The laser tracker, in a normal tracking mode, is designed to detect the measurement beam reflected by the reflector, with a tracking unit, and to compute a variable for the control of the alignment of the measurement beam from the detection, wherein additionally the laser tracker is designed, in an extraordinary tracking mode, in which the measurement beam reflected by the reflector cannot be detected in the tracking unit, to compute variables for the control of the alignment of the measurement beam from data which is acquired by at least one further apparatus. Thereby, the laser tracker comprises a capture unit and an overview apparatus, wherein the capture unit as well as the overview apparatus have a known position and orientation relative to the measurement beam. The capture unit comprises a detection region which lies between the detection region of the tracking unit and the detection region of the overview apparatus. The laser tracker is set up, in the extraordinary tracking mode, to carry out the above described method steps.

in the case that the target can be detected by the capture unit, controlling the alignment of the measurement beam in accordance with an angle at which the target is visible to the capture unit, and checking as to whether the target can be detected by the tracking unit;

in the case that the target can be detected by the tracking unit, initiating a change-over to the normal tracking mode;

in the case that the target can only be detected by the overview apparatus, controlling the alignment of the measurement beam in accordance with an angle at which the target is visible to the overview apparatus, and checking as to whether the target can be detected by the capture unit.

In a preferred embodiment of the invention, the capture unit uses the same measurement beam as the tracking unit, for determining the position of the reflector in its field of view. Alternatively, the capture unit itself can emit measurement light which (outside the laser tracker) runs coaxially to the measurement beam of the tracking unit and enters with this through common exit optics.

In a further preferred embodiment of the invention, the beam path of the measurement beam—and of the measurement light of the capture unit, in the case that this is not identical to the measurement beam—can be guided by the deflection device onto the target. Then selectively, by way of the deflection device, in a first operating mode of the defection device, either the tracking unit and the capture unit, or, in a second operating mode of the deflection device, the overview apparatus, with their beam path, can be aligned onto the target.

In other preferred embodiments of the invention, the capture unit emits measurement light which is parallel and not coaxial to the measurement beam of the tracking unit and enters through separate exit optics. Thereby, the capture unit preferably has its own illumination means. Moreover, the capture unit and the tracking unit can both operate with infrared light (i.e. be sensitive to infrared), wherein preferably spectral sensitivity regions of the capture unit and of the tracking unit with regard to incident light are different from one another, and in particular do not overlap one another. The two units, thus, do not react to the light of the respective other unit.

In a further preferred embodiment of the invention, the capture unit comprises a picture sensor for detecting a picture of the target. Thus not only is a PSD present, which only provides X and Y position signals of a light point, but a complete picture, by way of which on the one hand, as with PSD, readings for tracking the target, but on the other hand also further functions of the laser tracker can be realised. Such further functions are, for example, the determining of the orientation of the target, the identification of an object as the target, the tracking of an object by way of optical features ("feature detection and object tracking"). With this therefore, one can also identify and track objects which are not point-like, or entire light point arrangements.

Further preferred embodiments are to be deduced from the dependent patent claims. Thereby, features of the method claims, in an analogous fashion, can be combined with the device claims and vice versa.

BRIEF DESCRIPTION OF THE DRAWINGS

Hereinafter, the subject matter of the invention is explained in more detail by way of preferred embodiments which are represented in the accompanying drawings. In each case there are shown schematically in.

The reference numerals used in the drawings and their significance are listed in a conclusive manner in the list of reference numerals. Basically, the same parts have been provided with the same reference numerals in the figures.

DETAILED DESCRIPTION OF THE INVENTION

Figure 1:
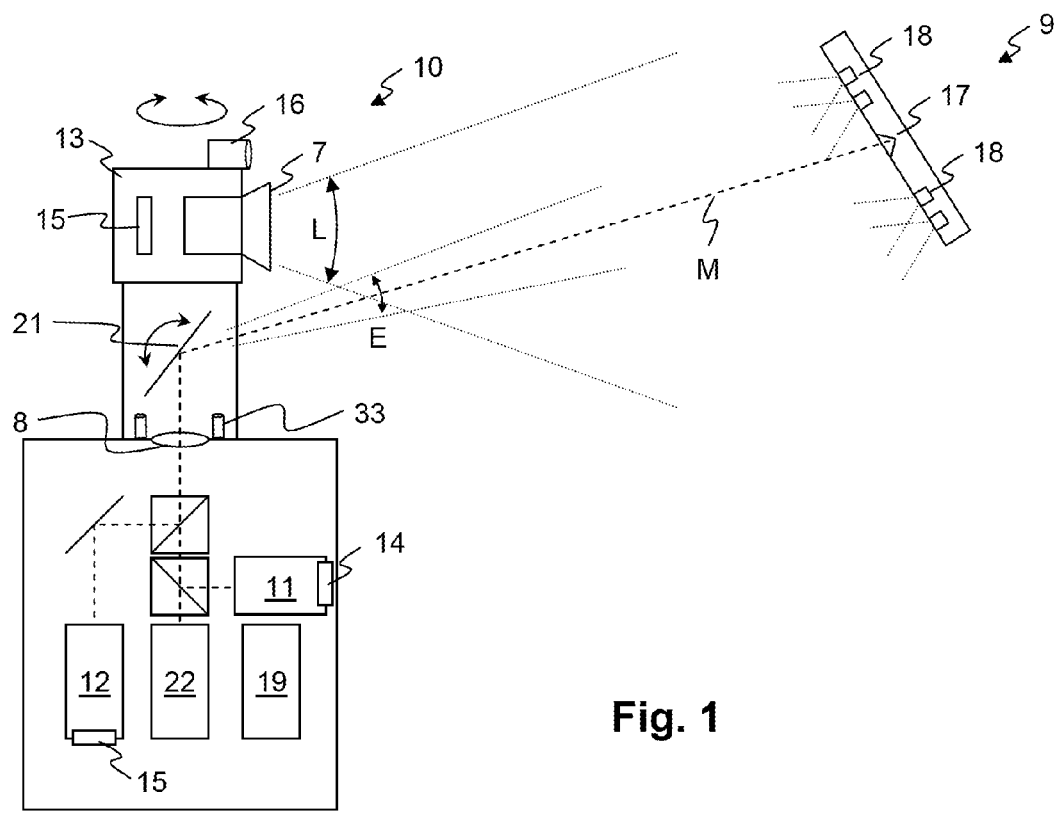
FIGS. 1 to 3 different embodiments of the invention.

FIG. 1 shows a structure of a laser tracker 10 in a first preferred embodiment of the invention. The laser tracker 10 comprises a tracking unit 11 with a measurement beam M, a capture unit 12 with a capture region E, and an overview apparatus 13 for localisation, with a localisation region L. The laser tracker 10 determines azimuth and elevation as well as the distance of a target 9, preferably of a retroreflector 17 on the target 9, with respect to the laser tracker 10. An absolute distance meter (ADM) and/or an interferometric distance meter (IFM) are present in a distance measurement unit 22, for determining and tracking the target distance. The overview apparatus 13 can have a zoom function.

The tracking unit 11 and the capture unit 12 use common output optics 8, i.e. the light is coupled in from and to the two units onto a common beam path. This contains the measurement beam and is aligned by way of a motorically driven tracking mirror 21 onto a reflector 17, for example a retroreflector such as a corner reflector prism or a triple mirror.

The tracking unit 11 comprises a picture sensor or however a PSD 14 (position sensitive device) which produces signals corresponding to the location of a light point on a surface of the PSD. The tracking unit 11 operates in the known manner by way of determining the position of the reflected measurement beam M on the PSD 14, for the correction of the alignment of the measurement beam by way of the computation and control unit 19 and actuators for moving the tracking mirror 21. The tracking unit 11 is thus responsible for the highly precise tracking of the measurement beam, and for this has a detection region with collimated (parallel) measurement light with a width of the measurement light beam of e.g. 1 mm to 2 mm.

The capture unit 12 comprises a camera or a two-dimensional picture sensor 15. A light beam produces a light point on the picture sensor 15. This light beam can be the reflected measurement beam (i.e. a part of the light coupled out from the measurement beam), or a second beam which preferably runs coaxially to the measurement beam M and is coupled into its beam path, but has a different wavelength. The capture unit 12 permits the capture of a moved target and the transition for the target tracking by way of the tracking unit 11 also during the movement of the target. An opening angle detected by the picture sensor 15 is preferably about ±5°, thus in total of 10°.

The overview apparatus 13 can be rotatable at least about the vertical axis, optionally also about the elevation axis, together with the alignment of the measurement beam. The overview apparatus 13 optionally has illumination means 16, by way of which reflecting elements fastened on the target (not drawn), can be illuminated and thus can be better visible to the overview apparatus 13. It is also possible for the illumination means 16 to be designed to communicate with the target. The reflector 17 is preferably provided with illumination means 18 in order to be recognised by the overview apparatus 13. The reflector 17 and illumination means 18 are arranged on a target 9 which can, for example, be provided with a scanning tip. The illumination means 18 can also be used, in order to determine the orientation of the target 9 by way of the overview apparatus or a further camera arranged on the laser tracker 10, so that all six degrees of freedom of the target 9 can be determined. The overview apparatus 13 is preferably a camera which is sensitive to light in the visible region. An opening angle which is detected by the picture sensor 15 is preferably about ±5 to ±15°. The overview apparatus 13 supplies picture data to the computation and control unit 19, for evaluation.

The data of the capture unit 12 and of the tracking unit 11 is likewise processed by the computation and control unit 19 and is used with the control of the alignment of the measurement beam M for tracking the reflector 17. The computation and control unit 19 is set up, in particular programmed, for carrying out the method according to the invention.

The detection region or the field of view or the opening angle of the capture unit 12 is, thus, greater than that of the tracking unit 11, and the detection region of the overview apparatus 13 is larger than that of the capture unit 12. As a rule, the maximum opening angle in the horizontal direction is approximately equal to that in the vertical direction. The opening angles then in both directions are in each case smaller or larger than the opening angles of the other units.

Figure 2:
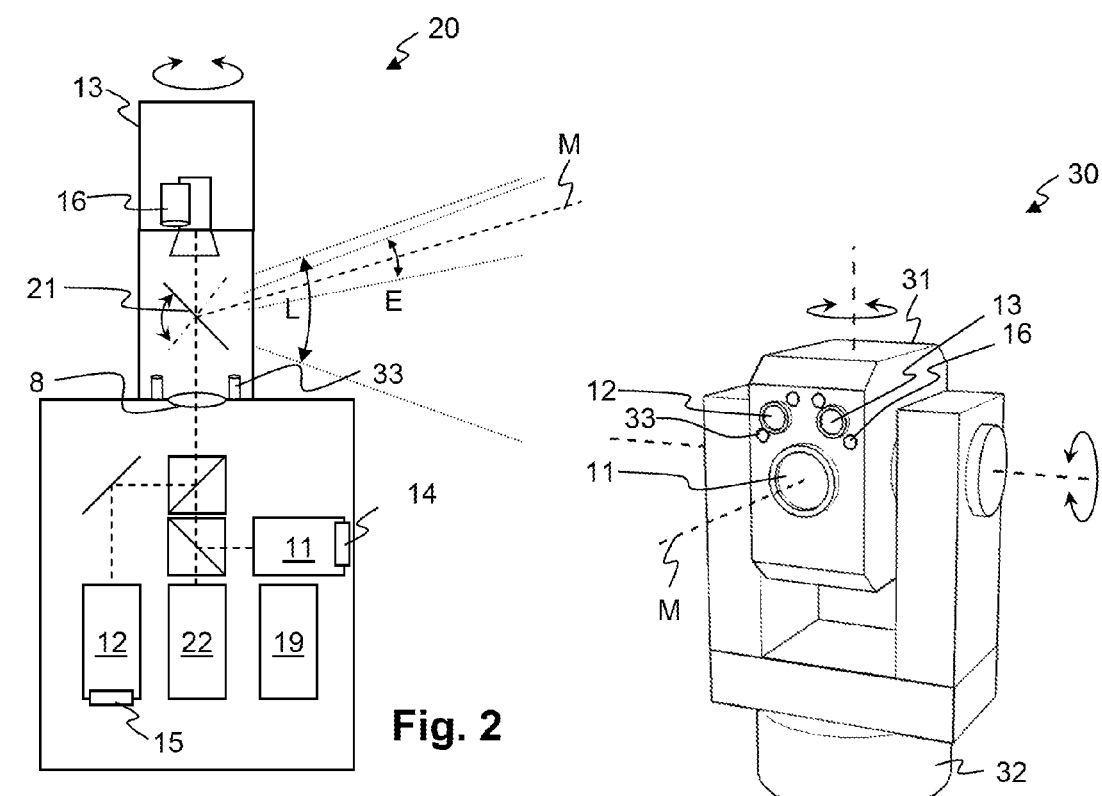

FIG. 2 shows a structure of a tracker 20 with a connectable overview apparatus 13 according to a second preferred embodiment of the invention. Thereby, hereinafter, only features which differ from the first embodiment are described. The overview apparatus 13 here is not aligned directly onto the reflector 17. Instead, exit optics of the overview apparatus 13 are directed onto the tracking mirror 21. The tracking mirror 21 is tilted, in order to operate the overview apparatus 13, so that the overview apparatus 13 looks through the tracking mirror 21 to the reflector 17. No individual mechanical drive is necessary for aligning the overview apparatus 13 by way of this. The overview apparatus 13 cannot be operated simultaneously with the tracking unit 11 or the capture unit 12 by way of this.

Figure 3:
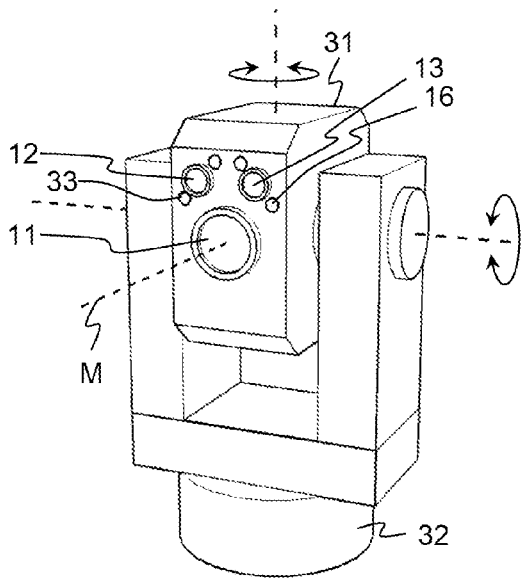

FIG. 3 shows a structure of a compact apparatus 39 according to a third preferred embodiment of the invention. Thereby, hereinafter only features which differ from the first embodiment are described. The tracking unit 11, the capture unit 12 and the overview apparatus 13 are arranged on a carrier 31 in a commonly moved manner. They are, thus, arranged to one another in a fixed relation, and together are aligned onto the reflector 17 by way of a motorically driven movement of the carrier 31 with respect to a base 32. The capture unit 12 and the tracking unit 11 here in each case have their own exit optics, but can also have single, common exit optics. Apart from the illumination means 16 for the overview apparatus 13, further illumination means 33 for the capture unit 12 are also present. Preferably, these further illumination means 33 emit light in the infrared region, and the capture unit 12 is only sensitive in the infrared region. The tracking unit 11 preferably comprises a picture detection sensor, in order to detect the deviation of the detected measurement beam from the desired position.

Figure 4:
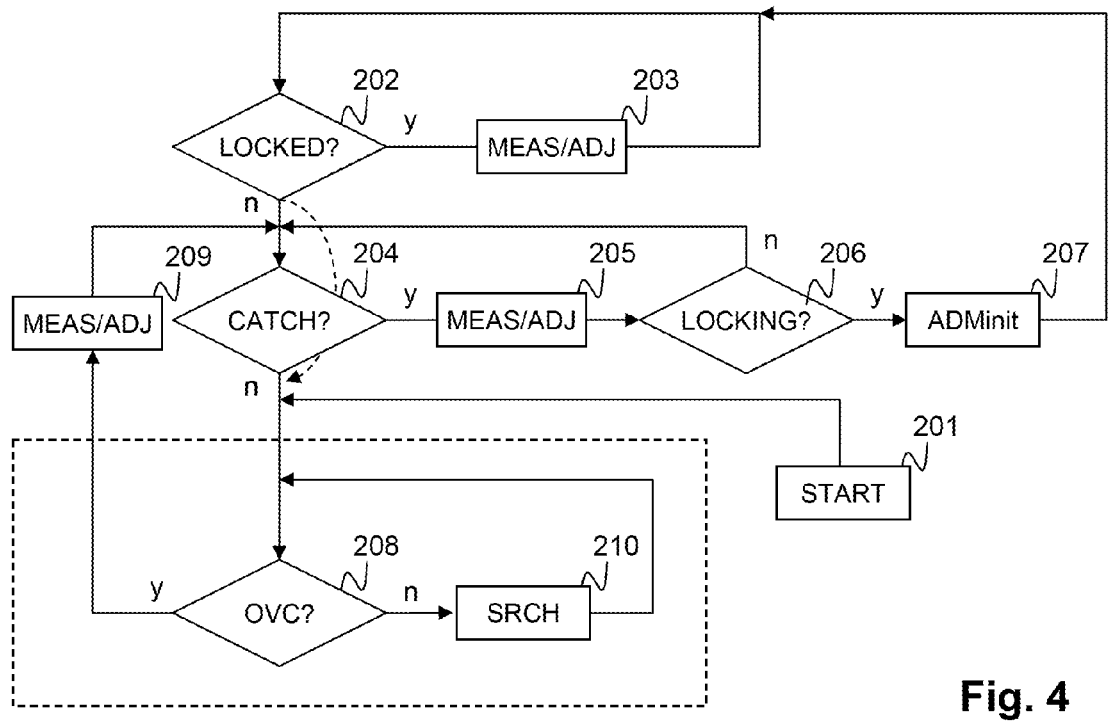
FIGS. 4 and 5 flow diagrams according to exemplary realisations of the inventive method.

FIG. 4 shows a preferred variant of the course of the method according to the invention. In the ordinary tracking mode, one checks whether the measurement beam M of the laser tracker is reflected by the target 9 or the reflector 17 and is visible to the tracking unit 11 (first decision 202 "LOCKED?" with respect to the detection of the reflected measurement beam).

If this is the case, then in a first following operation 203 "MEAS/ADJ", the position of the reflected measurement beam in the tracking unit 11 (thus for example on a PSD 14) is determined, a corrective movement computed therefrom, and the measurement beam M moved (adjusted) accordingly. Subsequently, one continues further with the step of the first decision 202.

If this is not the case, then one checks as to whether the target 9 is visible to the capture unit 12. Preferably, this is likewise effected by way of the measurement beam M, but by way of its projection onto the picture sensor 15 (second decision 204 "CATCH?" with respect to the detection of the target).

If this is the case, then in a second following operation 205 "MEAS/ADJ", the position of the reflected measurement beam is determined in the capture unit 12, a corrective movement computed therefrom, and the measurement beam M is moved (adjusted) accordingly. Subsequently, in a third decision 206 "LOCKING?", with respect to the detection of the reflected measurement beam, one checks whether the measurement beam M is visible to the tracking unit 11.

If this is the case, then preferably an absolute distance measurement is updated or is carried out afresh (absolute distance initialisation 207 "ADMinit"). Subsequently, one continues further with the step of the first decision 202.

If this is not the case, then one continues further with the second decision 204.

If the target 9 is not visible to the capture unit 12, then one checks as to whether the target 9 is visible to the overview apparatus 13 (fourth decision "OVC?" with respect to the visibility of the target). This is preferably effected by way of the reflection of light of the illumination means 16 at the target, and/or by way of the illumination means 18 at the target 9. Preferably, these illumination means and the overview apparatus 13 function with light in the visible region.

If the target 9 is visible to the overview apparatus 13, then in a third following operation 209 "MEAS/ADJ", the position of the reflected measurement beam is determined in the overview apparatus 13, a corrective movement computed therefrom and the measurement beam M moved accordingly. Subsequently, one continues further with the step of the second decision 204.

If the target 9 is not visible to the overview apparatus 13, then for example a search routine 210 "SRCH" is carried out. Such search routines are known per se. For example, the alignment of the tracker or at least of the optical viewing axis of the overview apparatus 13 is changed according to a predefined pattern and thereby one constantly checks as to whether the target 9 can be found on the picture of the overview apparatus 13 which corresponds to the respective alignment, or cannot be found (fourth decision 208). If, for example, the search remains without success during a given time or after the completion of a complete routine, the system, as the case can be, can stop with a corresponding communication to the operating person.

With a start 201 of the measurement system, one preferably begins with the target search with the largest viewing angle, thus with the fourth decision 208 with respect to the visibility of the target. In another preferred embodiment of the invention (not shown in the figure), the method begins by way of the target being manually moved with the reflector 17 into the detection region of the tracking unit 11 and being automatically detected by the tracking unit 11 and then tracked. Thereupon, the absolute distance measurement is carried out for the first time (analogously to "ADMinit").

In one variant of the invention, if according to the first decision 202, the reflected measurement beam is not detected in the tracking unit 11, the method is not continued with the second decision 204, but with the fourth decision 208 with respect to the visibility of the target (dashed arrow in FIG. 4).

Figure 5:
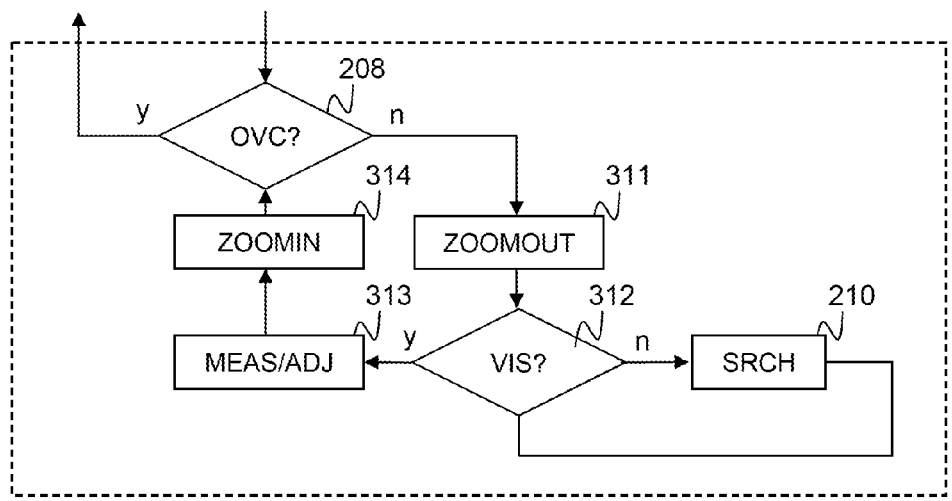

FIG. 5 shows a further variant of the course of the method according to the invention for the case that the overview apparatus 13 has a zoom function. The dashed edged part of FIG. 4 can then be replaced by elements of FIG. 5. The method then runs as follows:

If in the fourth decision 208 "OVC?" the target 9 is not visible to the overview apparatus 13, then firstly in a step of the viewing angle opening 311 "ZOOMOUT", the zoom objective 7 is set to a larger viewing angle or detection angle, and in a fifth decision 312 "VIS?", one checks with regard to the visibility of the target as to whether the target 9 is visible to the overview apparatus 13.

If the target 9 is not visible to the overview apparatus 13, then for example a search routine 210 "SRCH" is carried out as described above.

If the target 9 is visible to the overview apparatus 13, then in a fourth following operation 313 "MES/ADJ", the position of the reflected measurement beam in the overview apparatus 13 is determined, a corrective movement computed therefrom and the measurement beam is moved accordingly. In a step of viewing angle reduction 314 "ZOOMIN", the zoom objective 7 is set again to a smaller viewing angle and one continues further with the step of the fourth decision 208.

Basically of course, also further variants are possible in the sequence of the mentioned steps, which lead to the same result.

In a preferred embodiment of the invention, the position of the illumination means 18 at the target 9 is known and the overview apparatus 13 already during the capture, thus still during the extraordinary tracking mode, determines at least an estimation of the orientation of the target 9, by way of the imaging of the illumination means in the overview apparatus 13. Such methods for determining the orientation of a target 9 are known, but only in the context of a normal tracking mode, in which the distance between the tracker and the target is precisely known.

LIST OF REFERENCE NUMERALS 7 zoom optics
8 common exit optics
9 target
10 laser tracker
11 tracking unit
12 capture unit
13 overview apparatus for localisation
14 PSD
15 picture sensor
16 illumination means
17 reflector
18 illumination means on the target
19 computation and control unit
20 trackers with connectable overview apparatus
21 tracking mirror
22 absolute distance meter ADM and interferometer IFM
30 compact apparatus
31 carrier
32 base
33 illumination means for capture unit
M measurement beam
E capture region
L localisation region

The invention claimed is:

1. A tracking method, in which a target provided with a reflector is tracked by a measurement beam of a laser tracker, comprising the following steps:
   in a normal tracking mode, in a tracking unit, the measurement beam reflected by the reflector is detected, and a variable for the control of the alignment of the measurement beam is computed from the detection,
   additionally in an extraordinary tracking mode, in which, in the tracking unit, the measurement beam reflected by the reflector is not detected, variables for the control of the alignment of the measurement beam are computed from data which is acquired by at least one further apparatus,
   wherein the laser tracker comprises a capture unit and an overview apparatus, wherein the capture unit as well as the overview apparatus have a known position and orientation relative to the measurement beam, the capture unit comprises a detection region which lies between the detection region of the tracking unit and the detection region of the overview apparatus, and wherein the method in the extraordinary tracking mode comprises the following steps:
- in the case that the target is detectable by the capture unit, controlling the alignment of the measurement beam in accordance with an angle at which the target is visible to the capture unit, and checking as to whether the target can be detected by the tracking unit;
- in the case that the target can then be detected by the tracking unit, changing over to the normal tracking mode;
- in the case that the target can only be detected by the overview apparatus, controlling the alignment of the measurement beam in accordance with an angle at which the target is visible to the overview apparatus, and testing as to whether the target can be detected by the capture unit.

2. The method according to claim 1, wherein the described steps of the extraordinary tracking mode are carried out repeatedly until the change-over to the normal tracking mode is effected.

3. The method according to claim 1, wherein with the change-over to the normal tracking mode, the following step is carried out:
- carrying out an absolute distance initialisation for determining an absolute distance between the laser tracker and the target.

4. The method according to claim 1, wherein the overview apparatus has a zoom function and with this an adjustable detection angle, and in the case that the target is not detectable by the overview apparatus given a small detection angle, the following steps are carried out:
- enlarging the detection angle of the overview apparatus, and checking as to whether the target can be detected by the overview apparatus;
- in the case that the target can be detected by the overview apparatus, controlling the alignment of the measurement beam (M) in accordance with the angle at which the target is visible to the overview apparatus; and reducing the detection angle of the overview apparatus; or
- in the case that the target cannot be detected by the overview apparatus, carrying out a search routine for localising the target by way of moving the overview apparatus.

5. The method according to claim 1, wherein selectively, by way of a deflection device:
- either, in a first operating mode of the deflection device, the tracking unit and the capture unit,
- or, in a second operating mode of the deflection device, the overview apparatus can be aligned with their beam path onto the target, and the method has the steps of:
- operating in the first operating mode, or changing to the first operating mode, when the tracking unit or the capture unit detect, track or search the target;
- operating in the second operating mode, or changing to the second operating mode, when the overview apparatus detects or searches the target.

6. A measurement system comprising:
a laser tracker, with which a target provided with a reflector can be tracked by a measurement beam of a laser tracker, wherein the laser tracker is designed, in a normal tracking mode, with a tracking unit, to detect the measurement beam reflected by the reflector and to compute a variable for the control of the alignment of the measurement beam from the detection, wherein additionally, in an extraordinary tracking mode, in which the measurement beam reflected by the reflector cannot be detected in the tracking unit, the laser tracker is designed to compute variables for the control of the alignment of the measurement beam from data which is acquired by at least one further apparatus, and wherein the laser tracker comprises a capture unit and an overview apparatus, wherein the capture unit as well as the overview apparatus have a known position and orientation relative to the measurement beam, the capture unit comprises a detection region which lies between the detection region of the tracking unit and the detection region of the overview apparatus, and the laser tracker is designed, in the extraordinary tracking mode such that:
- in the case that the target can be detected by the capture unit, to the alignment of the measurement beam in accordance with an angle at which the target is visible to the capture unit, and to check as to whether the target can be detected by the tracking unit;
- in the case that the target can be detected by the tracking unit, to initiate a change-over to the normal tracking mode;
- in the case that the target can be detected only by the overview apparatus, to control the alignment of the measurement beam (M) in accordance with an angle at which the target is visible to the overview apparatus, and to check as to whether the target can be detected by the capture unit.

7. The measurement system with a laser tracker according to claim 6, wherein the capture unit uses the same measurement beam as the tracking unit, for determining the position of the reflector in the capture unit's field of view.

8. The measurement system with a laser tracker according to claim 6, wherein the capture unit emits measurement light which is coaxial to the measurement beam of the tracking unit and with this measurement beam passes through common exit optics.

9. The measurement system with a laser tracker according to claim 7, wherein the beam path of the measurement beam—and of the measurement light of the capture unit, in the case that this is not identical to the measurement beam—can be guided onto the target by way of a deflection device.

10. The measurement system with a laser tracker according to claim 9, wherein by way of the deflection device, selectively
- either, in a first operating mode of the deflection device, the tracking unit and the capture unit,
- or, in a second operating mode of the defection unit, the overview apparatus can be directed with their beam path onto the target.

11. The measurement system, with a laser tracker according to claim 6, wherein the capture unit emits measurement light which is parallel and not coaxial to the measurement beam of the tracking unit and goes through separate exit optics.

12. The measurement system with a laser tracker according to claim 11, wherein the capture unit comprises its own illumination means.

13. The measurement system with a laser tracker according to claim 12, wherein the capture unit and the tracking unit both operate with infrared light, and spectral sensitivity regions of the capture unit and of the tracking unit with respect to incident light are different from one another and do not overlap one another.

14. The measurement system with a laser tracker according to claim 6, wherein the overview apparatus comprises zoom optics.

15. The measurement system with a laser tracker according to claim 6, wherein the capture unit comprises a picture sensor for detecting a picture of the target and for determining measurement values for tracking the target.

* * * * *